United States Patent
Thomas et al.

(10) Patent No.: US 12,311,873 B2
(45) Date of Patent: May 27, 2025

(54) METHOD OF DETECTING USE OF A LAP BELT ONLY ROUTING OF A COMBINED LAP BELT/SHOULDER BELT SEAT BELT SYSTEM IN A VEHICLE

(71) Applicant: GM Global Technology Operations LLC, Detroit, MI (US)

(72) Inventors: Scott D. Thomas, Novi, MI (US); Sam Jamal, Dearborn, MI (US); Arjun Khanna, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 18/231,073

(22) Filed: Aug. 7, 2023

(65) Prior Publication Data

US 2025/0050836 A1   Feb. 13, 2025

(51) Int. Cl.
*B60R 22/48*   (2006.01)
*B60R 22/00*   (2006.01)

(52) U.S. Cl.
CPC .............. *B60R 22/48* (2013.01); *B60R 22/00* (2013.01); *B60R 2022/4825* (2013.01)

(58) Field of Classification Search
CPC ... B60R 21/00; B60R 21/0011; B60R 21/013; B60R 21/01532; B60R 21/01546; B60R 21/01554; B60R 22/00; B60R 22/02; B60R 22/03; B60R 22/44; B60R 22/48; B60R 22/485
See application file for complete search history.

(56) References Cited

U.S. PATENT DOCUMENTS

| | | | |
|---|---|---|---|
| 10,688,951 B2 | 6/2020 | Coughlin et al. | |
| 10,994,696 B2 | 5/2021 | Thomas et al. | |
| 11,059,453 B2 | 7/2021 | Thomas et al. | |
| 11,117,545 B2 | 9/2021 | Thomas | |
| 11,491,940 B2 | 11/2022 | Thomas | |
| 11,603,060 B2 | 3/2023 | Thomas et al. | |
| 2001/0040065 A1* | 11/2001 | Takagi | B60R 21/01554 180/274 |
| 2007/0144810 A1* | 6/2007 | Tanaka | B60R 22/46 280/806 |
| 2007/0195990 A1* | 8/2007 | Levy | G06V 10/225 340/457.1 |
| 2007/0282505 A1* | 12/2007 | Bolton | B60R 22/02 701/45 |

FOREIGN PATENT DOCUMENTS

DE   102020106681 A1   10/2020

OTHER PUBLICATIONS

German Application No. 10 2023 132 588.4 filed Nov. 22, 2023; German Office Action dated Mar. 20, 2024; 5 pages.

* cited by examiner

*Primary Examiner* — Van T Trieu
(74) *Attorney, Agent, or Firm* — CANTOR COLBURN LLP (57) ABSTRACT

A method of detecting improper routing of a seat belt having a lap belt portion and a shoulder belt portion by an occupant of a vehicle includes detecting a movement of the seat belt indicating that the shoulder belt portion was placed behind a back of the occupant, and providing a warning indicting improper routing of the shoulder belt portion of the seat belt if the movement of the seat belt indicates that the shoulder belt portion was placed behind the back of the occupant.

20 Claims, 7 Drawing Sheets

$$\text{False Reset Threshold} = \left[\frac{\text{Reset \% Value}}{100}\right] \cdot \left[\text{Over the Head Threshold Value} - \text{Min Payout Value When the Seat Belt is Improperly Routed}\right] + \text{Min Payout Value When the Seat Belt is Improperly Routed}$$

METHOD OF DETECTING USE OF A LAP BELT ONLY ROUTING OF A COMBINED LAP BELT/SHOULDER BELT SEAT BELT SYSTEM IN A VEHICLE

INTRODUCTION

The subject disclosure relates to the art of passenger restraint systems and, more particularly, to a method of detecting use of a lap belt only routing of a combined lap belt/shoulder belt seat belt system in a vehicle.

Many passenger vehicles, particularly those manufactured after 1968, are equipped with passenger restraint systems. Initially, vehicles were equipped with lap belts. In some cases, an additional, separate, shoulder belt may have also been provided. The use of lap belts was shown to reduce deceleration injuries. As vehicle seating systems developed, improvements in restraint systems also came into being. A combined lap belt and shoulder belt including a retractor responsive to deceleration forces was developed and incorporated into vehicles. The combined lap belt/shoulder belt further reduced deceleration injuries and better coupled the occupant to the vehicle thereby distributing the seat belt loading over more structural regions of the occupant's body during a crash.

While the combined lap belt/shoulder belt has been shown to reduce deceleration injuries, many individuals find the shoulder belt portion to be uncomfortable. In order to avoid discomfort, certain individuals move the shoulder belt over their heads and behind their backs. In this position, these individuals rely solely on the lap belt to counteract sudden decelerations. Vehicle restraint systems are designed to work cooperatively. In some seating positions, lap belts and shoulder belts cooperate with passive restraint systems, such as airbags, to reduce deceleration injuries. If the shoulder belt is removed, the vehicle restraint system will not function as designed. Accordingly, it is desirable to provide system to detect and prevent the non-use of a shoulder belt in a combined lap belt/shoulder belt seat belt system.

SUMMARY

A method of detecting improper routing of a seat belt having a lap belt portion and a shoulder belt portion by an occupant of a vehicle, in accordance with a non-limiting example, includes detecting a movement of the seat belt indicating that the shoulder belt portion was placed behind a back of the occupant, and providing a warning indicting improper routing of the shoulder belt portion of the seat belt if the movement of the seat belt indicates that the shoulder belt portion was placed behind the back of the occupant.

In addition to one or more of the features described herein detecting the movement of the seat belt includes determining whether the seat belt has been withdrawn from a retractor a length that exceeds an over-the-head threshold length.

In addition to one or more of the features described herein determining whether the seat belt has retracted into the retractor at a rate that is greater than a retraction velocity threshold.

In addition to one or more of the features described herein detecting the movement of the seat belt includes determining whether the seat belt has been withdrawn from the retractor a length that is less than a behind-the-back threshold length.

In addition to one or more of the features described herein detecting that the shoulder belt portion was placed behind the back of the occupant occurs when the seat belt length is less than the behind-the-back threshold length that is determined from a minimum seat belt routing length.

In addition to one or more of the features described herein checking for a length-based reset of the seat belt after detecting the movement of the seat belt indicates that the shoulder belt portion was placed behind the back of the occupant.

In addition to one or more of the features described herein checking for the length-based reset includes determining whether a change in the length of the seat belt is less than a false reset threshold.

In addition to one or more of the features described herein indicating a false reset if the change in the length of the seat belt is less than the false reset threshold.

In addition to one or more of the features described herein determining whether the seat belt has been withdrawn from the retractor by a length that exceeds the over-the-head threshold length after indicating the false reset.

In addition to one or more of the features described herein determining whether the length of the seat belt retracted into the retractor at a selected rate if the seat belt has been withdrawn from the retractor by a length that exceeds the over-the-head threshold length after the false reset is indicated.

In addition to one or more of the features described herein determining whether the seat belt has been withdrawn from the retractor a length that is less than a behind-the-back threshold length.

In addition to one or more of the features described herein checking for the length-based reset includes identifying that the change in the length of the seat belt occurred within a time duration that is less than a false reset time threshold.

In addition to one or more of the features described herein indicating a properly routed shoulder belt portion of the seat belt if the length of the seat belt is below the reset threshold and above the false reset threshold.

In addition to one or more of the features described herein recalculating the false reset threshold based on the over-the-head threshold length, a minimum payout value when the seat belt is improperly routed, and a reset percent value after detecting a false reset.

In addition to one or more of the features described herein the over-the-head threshold length is determined from a minimum seat belt routing length.

In addition to one or more of the features described herein sensing one of a presence of an occupant in a seat in the vehicle associated with the seat belt and sensing that the length of the seat belt withdrawn from a retractor exceeds a minimum seat belt routing length.

In addition to one or more of the features described herein inhibiting vehicle operation if the warning indicting improper routing of the shoulder belt portion of the seat belt is active.

In addition to one or more of the features described herein detecting the movement of the seat belt includes monitoring a seat belt length played out from a retractor with a first sensor and monitoring that the seat belt is buckled with a second sensor.

In addition to one or more of the features described herein setting one or more decision flags when detecting movement of the seat belt.

A vehicle, in accordance with a non-limiting example, includes a body including a passenger compartment and a seat arranged in the passenger compartment. The seat includes the seat belt having the lap belt portion and the shoulder belt portion. The seat belt is operatively connected to a controller programmed to perform the method described herein.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
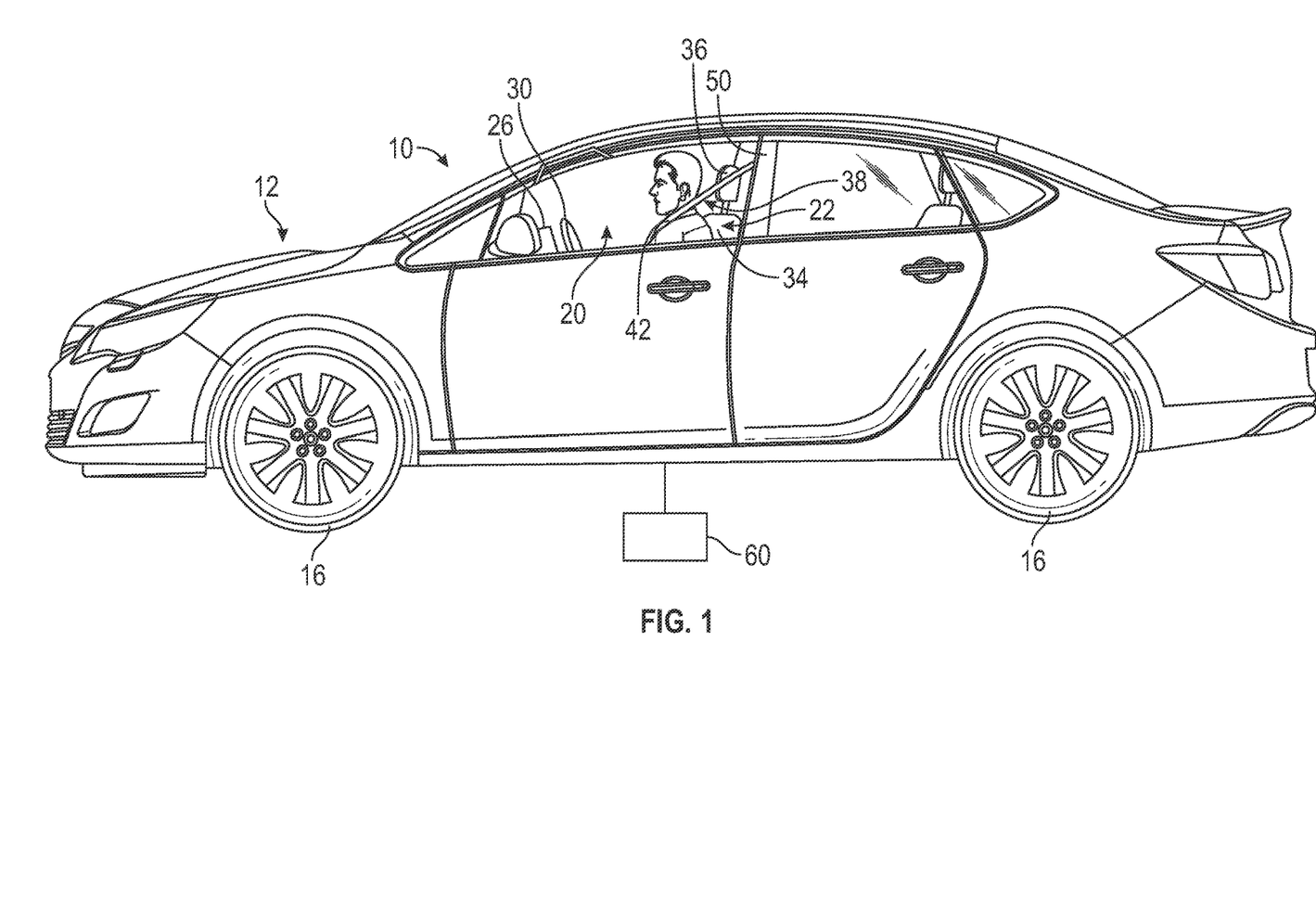
FIG. 1 is a left side view of a vehicle including seat belt having a lap belt, a shoulder belt, and a lap belt use only detection system, in accordance with a non-limiting example.

A vehicle, in accordance with a non-limiting example, is indicated generally at 10 in FIG. 1. Vehicle 10 includes a body 12 supported on a plurality of wheels 16. Body 12 includes a passenger compartment 20 within which are arranged a number of seats, such as indicated at 22. Seat 22 is positioned behind an instrument panel 26. A steering wheel 30 is arranged between seat 22 and instrument panel 26. Seat 22 includes a seat base 32, FIG. 2, and a seat back 34 supporting a head rest 36.

Figure 2:
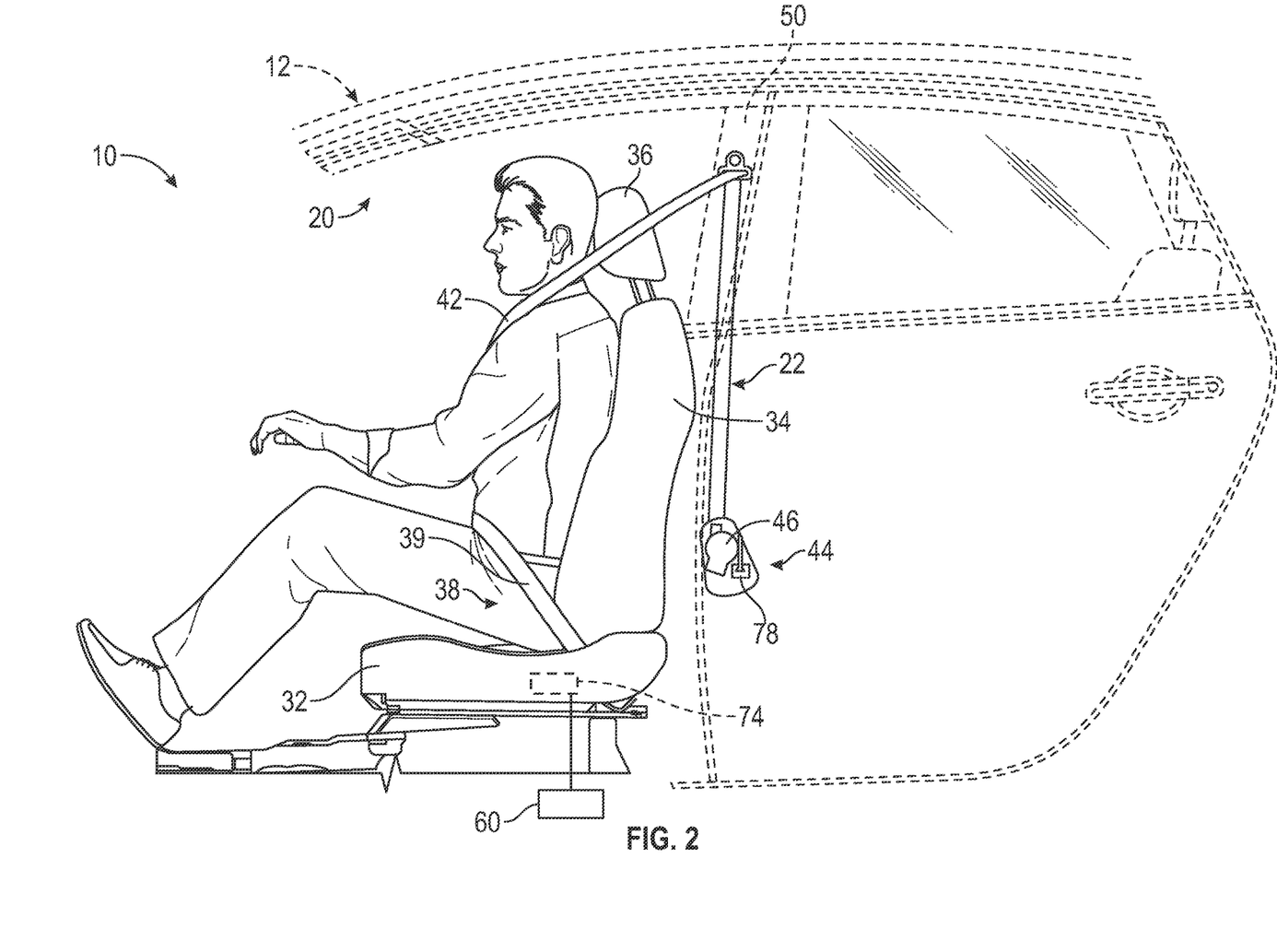
FIG. 2 is a left side view of a seat from the vehicle of FIG. 2 depicting the seat belt having the lap belt, the shoulder belt, and the lap belt use only detection system, in accordance with a non-limiting example.

Referring to FIG. 2, a seat belt 38 including a lap belt portion 39 extends across seat base 32 when an occupant is in seat 22. Seat belt 38 also includes a shoulder belt portion 42. A retractor mechanism 44 including a pre-tensioner 46 supports seat belt 38. Retractor mechanism 44 is mounted to, for example, a "B"-pillar 50 of body 12. In a non-limiting example, vehicle 10 includes a seat belt monitoring system 60 that makes multiple checks to determine whether seat belt 38 is being worn and also whether the shoulder belt portion 42 has been manipulated behind a passenger. At this point, it should be understood that seat belt monitoring system 60 begins to monitor seat belt 38 once signals are received indicating that, for example, seat 22 is occupied and seat belt 38 is buckled.

Figure 3:
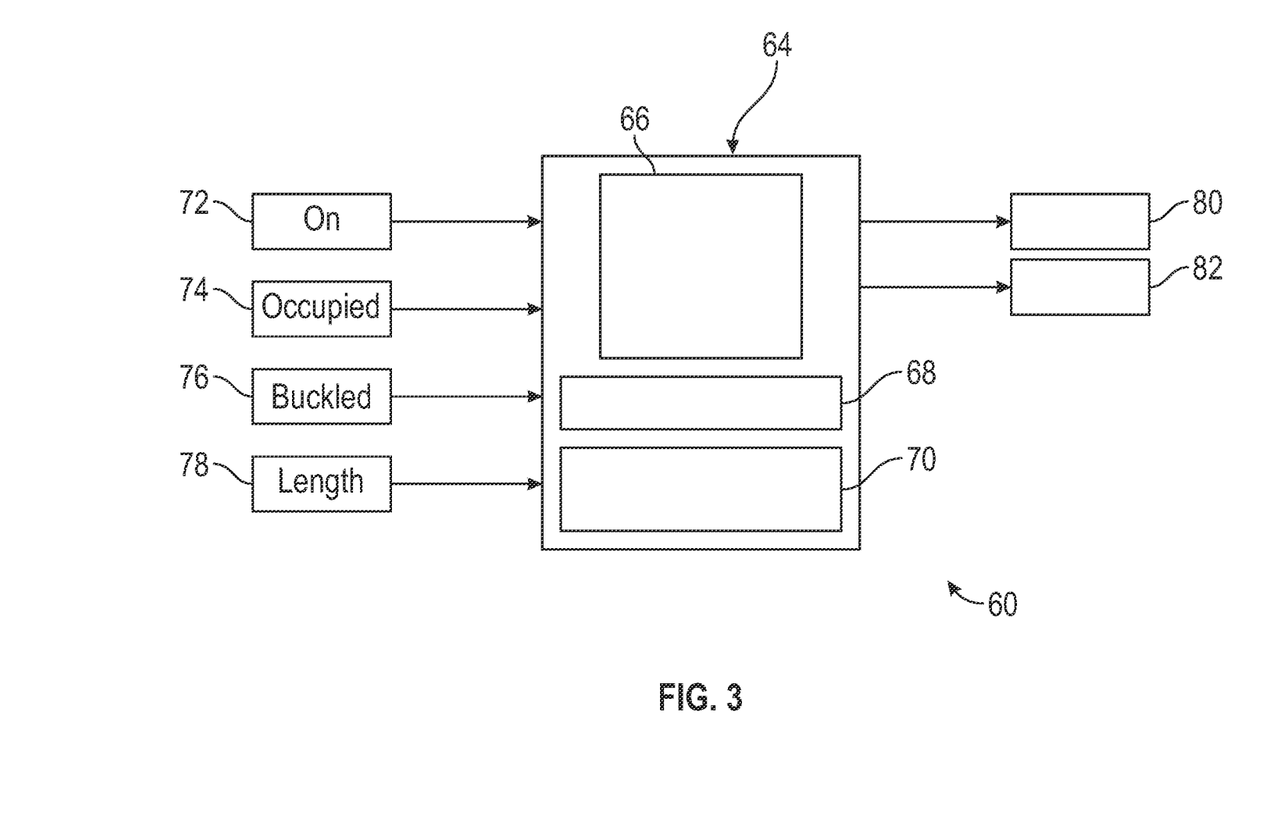
FIG. 3 is a block diagram illustrating various hardware components of the lap belt use only detection system, in accordance with a non-limiting example.

Referring to FIG. 3, seat belt monitoring system 60 includes a controller 64 having a central processing unit (CPU) 66, a non-volatile memory 68 that stores control logic for monitoring seat belt 38, and a seat belt monitoring module 70. Seat belt monitoring system 60 is connected to a vehicle sensor 72 that indicates a status of vehicle 10 (power on/off, door open/closed, vehicle in drive mode), a seat presence sensor 74 that detects occupant presence in seat 22, a buckle sensor 76 that checks whether seat belt 38 is buckled, and a seat belt payout sensor 78 that measures a length of seat belt 38 un-spooled from retractor mechanism 44. The number and location of the sensors may vary. For instance, seat presence sensor 74 may be located within seat 22 or be located remotely. Seat belt monitoring system 60 may also be connected to a warning output 80 that signals to the occupant that seat belt 38 is improperly routed and a vehicle output 82 that is configured to prevent or inhibit operation of vehicle 10 until the signal from warning output 80 has been resolved.

Figure 4:
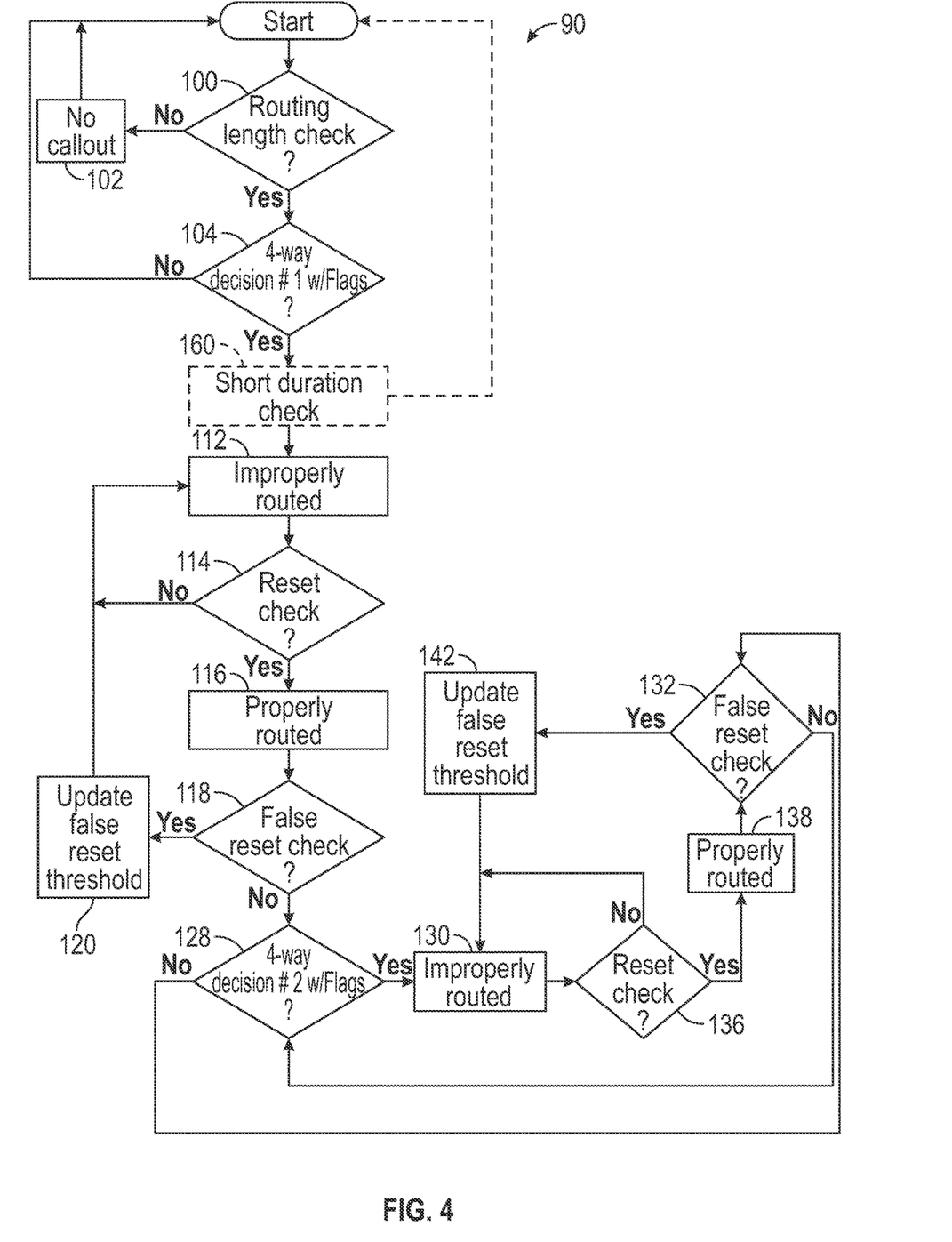
FIG. 4 is a flow chart illustrating a method of detecting lap belt use only, in accordance with a non-limiting example.

Reference will now follow to FIG. 4 in describing a method 90 for monitoring seat belt 38 embodied by the control logic stored in non-volatile memory 68. As indicated herein, method 90 is initiated by seat belt monitoring system 60 after signals are received from at least seat sensor 74 and buckle sensor 76 indicating that, for example, seat 22 is occupied and seat belt 38 is buckled. In block 100, seat belt monitoring module 70 initially performs a routing length check.

The routing length check determines whether a length of seat belt 38 unspooled from retractor mechanism 44 is greater than or equal to a minimum seat belt length threshold stored in non-volatile memory 68. The minimum seat belt length threshold represents the minimum length required for the passenger to wear lap belt portion 39 and shoulder belt portion 42 of seat belt 38 in a configuration where they are both routed over the passenger's body. Alternatively, the minimum seat belt length threshold can represent the minimum seat belt length where the method described herein can provide accurate seat belt routing detection for a lap belt only routing. The length of seat belt 38 unspooled from retractor mechanism 44 which is compared to the minimum seat belt length threshold can be referred to as the minimum seat belt routing length, which is the minimum seat belt length unspooled from retractor mechanism 44 within a specified time window after seat belt 38 is buckled or the minimum length unspooled from retractor mechanism 44 within this specified time window prior to the length increasing beyond a specified delta amount. If the length of seat belt 38 unspooled from retractor mechanism 44 is less than the minimum seat belt length threshold no routing warning and/or callout is issued in block 102 and monitoring continues. If the length of seat belt 38 unspooled from retractor mechanism 44 is greater than or equal to the minimum seat belt length threshold, a series of determinations are made in block 104.

In block 104, a determination is made whether the length of seat belt 38 unspooled from retractor mechanism 44 exceeds an over-the-head threshold based on data stored in non-volatile memory 68. In accordance with a non-limiting example, seat belt monitoring module 70 may also check to determine whether the length of seat belt 38 unspooled from retractor mechanism 44 exceeds the over-the-head threshold and was unspooled in a time duration that is equal to or exceeds an over-the-head time duration threshold stored in non-volatile memory 68. The over-the-head time duration threshold is a stored value corresponding to a time duration taken from the time that the over-the-head threshold is exceeded to a point back in time as defined by length of the time duration threshold.

Figure 5:
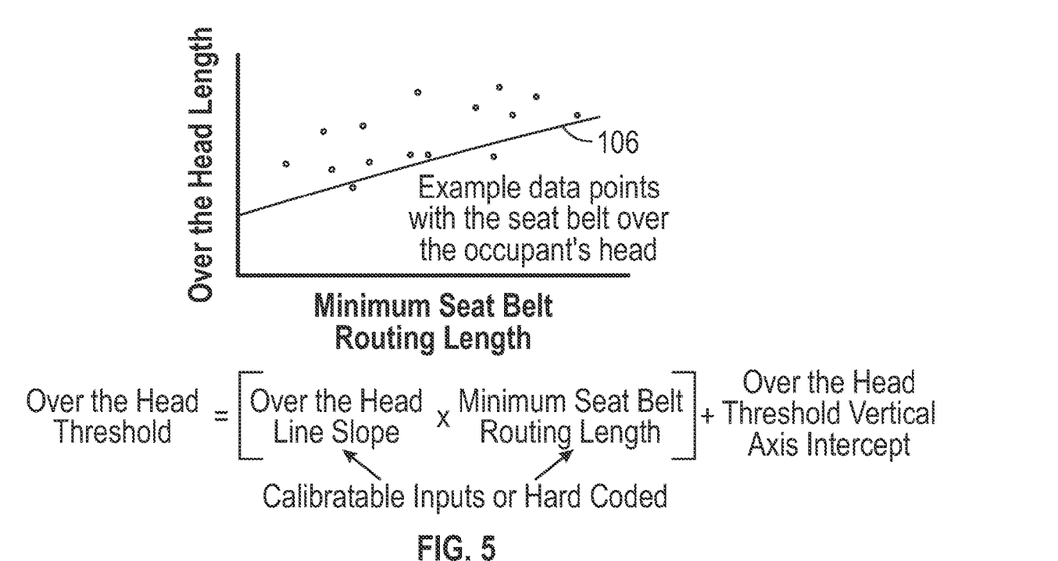
FIG. 5 is a graph and formula depicting a over-the-head threshold value calculation, in accordance with a non-limiting example.

For each occupant's minimum seat belt routing length, an over-the-head threshold value can be determined. The over-the-head threshold is determined from, for example, line 106 shown in FIG. 5 which is positioned on the FIG. 5 chart based on sample lengths when the seat belt is passed over-the-head of a passenger. The graph in FIG. 5 shows the minimum seat belt routing length on the horizontal axis (which is the minimum seat belt length within a specified time window after the seat belt is buckled or the minimum length within this specified time window prior to the length increasing beyond a specified delta amount). This graph also shows the over-the-head length on the vertical axis. Note that the over-the-head length is delta length between when the shoulder belt is lifted over-the-head and the minimum seat belt routing length.

The over-the-head threshold is calculated from a line equation derived from fitting measured data from actual people as they put the shoulder belt over their head. In another non-limiting example measured data may be used when actual people put the shoulder belt on top of their head, as this is the minimum length to move the shoulder belt from in front of their body to behind their body. This threshold is calculated as follows: Over-the-head threshold=(over-the-head line slope×minimum seat belt routing length)+over-the-head vertical axis intercept. The over-the-head line slope is the slope of line 106 and the over-the-head vertical axis intercept is the vertical axis intercept for line 106. Line 106 is determined so that the majority of the measured data points, from a study of real people and the seat belt length to lift the shoulder belt over their head, fall above the line. Thus, the over-the-head threshold is a delta length value above the passenger's minimum seat belt routing length. Note as an alternative to using an equation to associate the over-the-head threshold to the minimum seat belt routing length, a look-up table could be used. In addition, if an equation is used, a higher order equation than a linear equation could be used.

At this point, a determination is made whether the length of seat belt 38 decreases at a rate having a negative magnitude that exceeds a retraction velocity threshold stored in non-volatile memory 68 seat belt 38 is re-spooled onto retractor mechanism 44. Still in block 104, seat belt monitoring module 70 then determines whether the length of seat belt 38 unspooled from retractor mechanism 44 is less than a behind-the-back threshold based on data stored in memory 68. The behind-the-back threshold is calculating a slope of determined from a line 108 shown in FIG. 6 having a position that is based on sample lengths when seat belt 38 is positioned behind the passengers back.

Figure 6:
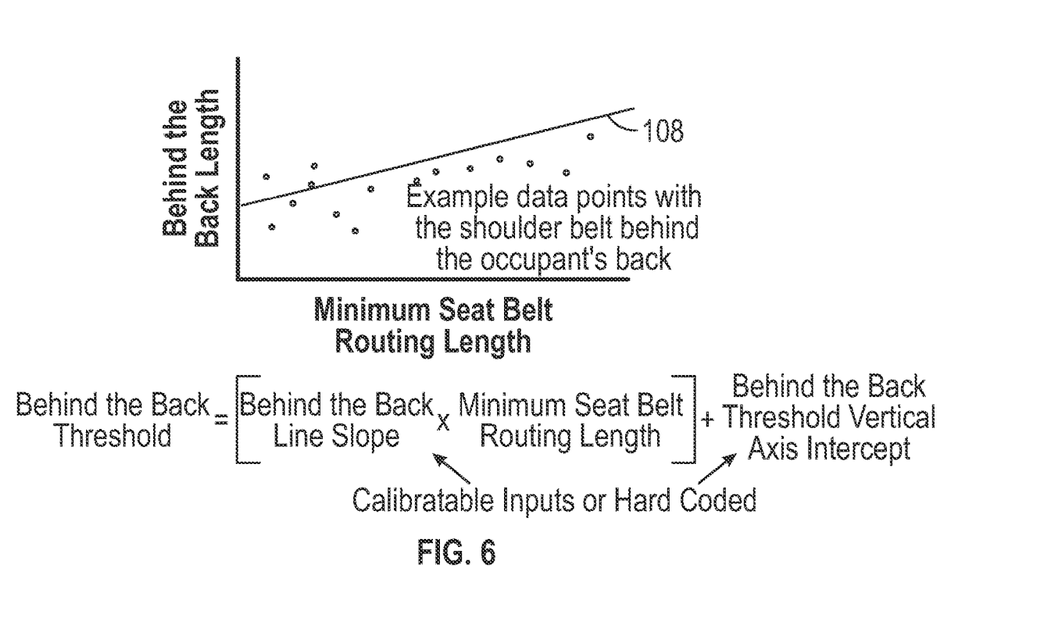
FIG. 6 is a graph and formula depicting a behind the back threshold value calculation, in accordance with a non-limiting example.

The graph in FIG. 6 has the minimum seat belt routing length on the horizontal axis (which is the minimum seat belt length within a specified time window after the seat belt is buckled or the minimum length within this specified time window prior to the length increasing beyond a specified delta amount). This graph shown in FIG. 6 also has the behind the back length on the vertical axis. The behind the back length is delta length between when the shoulder belt is routed behind the back and the minimum seat belt routing length. The behind the back threshold is calculated from a line equation derived from fitting measured data from actual people when they put the shoulder belt behind their back as follows: Behind the back threshold=(behind the back line slope×minimum seat belt routing length)+behind the back length vertical axis intercept.

The behind the back line slope is the slope of line 106 and the behind the back vertical axis intercept is the vertical axis intercept for line 106. Line 106 is determined so that the majority of the measured data points, from a study of real people and the seat belt length when the shoulder belt is behind the back, fall below the line. Thus, the behind the back threshold is a delta length value below the passenger's minimum seat belt routing length. As an alternative to using an equation to associate the behind the back threshold to the minimum seat belt routing length, a look-up table could be used. In addition, if an equation is used, a higher order equation than a linear equation could be used.

Finally, seat belt monitoring module 70 determines whether the over-the-head threshold, the retraction velocity threshold, and the behind the back threshold are all met in a time period that is less than an event threshold. The event threshold is defined from the point in time that the over-the-head threshold is exceeded to the point in time when the behind the back threshold is passed. Note that within block 104, the retraction velocity threshold, over-the-head time duration threshold and the event threshold evaluations are optional and may or may not be included.

At this point, it should be understood that the sequence of events in block 104 may vary. That is, the sequence of decisions may occur in a sequence opposite to the order that the events occur in real time when a passenger moves the shoulder belt portion 42 from in front of the body to behind the body to create a lap belt only routing condition via the usage of decision flags in the logic. In such a case, decision's flag may be used as identifiers to set of particular conditions. For example, the number of detections could be expanded to include additional threshold based decisions. In block 104, determinations may be made whether the seat belt length is below the behind the back threshold and set a flag=1. If the flag=1 then a determination may be made whether the seat belt length retraction rate is below the retraction velocity threshold and set a flag=2. If flag=2, a determination may be made whether the seat belt length is above the over-the-head threshold and if so, then flag=3. When flag=3, monitoring may continue to block 112.

If the over-the-head threshold, the retraction velocity threshold, and the behind the back threshold are all met in a time period that is less than the event threshold, monitoring continues in block 112, if all criteria met, an improperly routed indicator is set in block 112. At this point, it should be understood that the event threshold is a time period stored in non-volatile memory 68 corresponding to a statistically calculated time needed to accurately determine the over-the-head threshold, the retraction velocity threshold, and the behind the back threshold.

After setting the improperly routed indicator in block 112, seat belt monitoring module 70 performs a reset check in block 114. This reset detects if the seat belt was likely moved back over the passenger's head and retracted to a length that indicates that the shoulder belt is routed around the front of the passenger's torso. During the reset check, seat belt monitoring module 70 determines whether seat belt 38 is unspooled from the retractor mechanism 44 and then re-spooled back into the retractor so that reset threshold value is passed as the seat belt re-spools into the retractor (after it has passed the reset threshold as the seat belt was pulled out of the retractor. Typically, the reset threshold is the same as the over-the-head threshold.

If a reset is detected, the improper routing indicator is replaced with a proper routing indicator in block 116 and seat belt monitoring module 70 determines whether the reset was a false reset in block 118. Seat belt monitoring module 70 determines whether seat belt 38 is respooled an amount onto retractor mechanism 44 that is less than a false reset threshold. If so, the false reset threshold is updated in block 120 and monitoring returns to block 112. If not, then a second series of determinations is made in block 128. The false reset threshold value is a stored length likely from a statistical study for determining when improper routing was detected when the shoulder belt is moved from behind the back and then returned to a position behind the back, where only the lap belt is worn in both cases. In addition, at block 118, the method may optionally determine if the false reset occurred within a false reset time threshold. For this optional additional false reset time threshold check, if the length of time from the reset to properly routed in block 116 to when the false reset threshold is passed is less than the false reset time threshold, then the method proceeds to block 120. Otherwise, the method proceeds to block 128.

Figure 7:
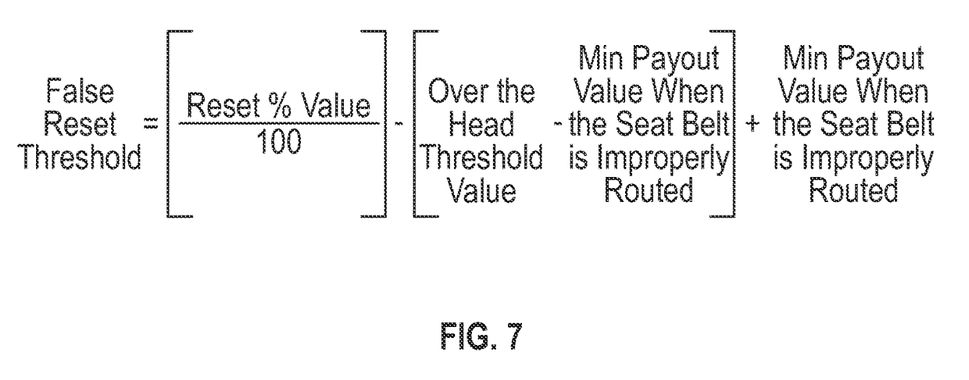
FIG. 7 is a formula depicting a false reset threshold calculation, in accordance with a non-limiting example.

At block 120, the false reset threshold is updated via the equation shown in FIG. 7. This equation uses three values. One of these is the previously discussed over-the-head threshold. It also uses the minimum payout value when the seat belt is improperly routed which is stored and continuously updated when seat belt 38 is detected as improperly routed in block 112. Finally, it uses a reset percent value where a value of 100 equates to the over-the-head threshold value and 0 equates to the minimum payout when improperly routed value. From these values, the false reset threshold is updated using the following equation: False reset threshold=(reset percent value/100)×(over-the-head threshold−minimum payout value when the seat belt is improperly routed)+minimum payout value when the seat belt is improperly routed.

In block 128 seat belt monitoring module 70 makes the same determinations made in block 104. That is, a determination is made whether the length of seat belt 38 unspooled from retractor mechanism 44 exceeds an over-the-head threshold based on data stored in non-volatile memory 68. In accordance with a non-limiting example, seat belt monitoring module 70 may also check to determine whether the length of seat belt 38 unspooled from retractor mechanism 44 exceeds the over-the-head threshold and was unspooled in a time duration that is equal to or exceeds an over-the-head time duration threshold stored in non-volatile memory 68. At this point, a determination is made whether the length of seat belt 38 decreases at a rate having a negative magnitude that exceeds a retraction velocity threshold stored in non-volatile memory 68 when seat belt 38 is re-spooled onto retractor mechanism 44.

Still in block 128, seat belt monitoring module 70 then determines whether the length of seat belt 38 unspooled from retractor mechanism 44 is less than a behind-the-back threshold based on data stored in memory 68. Finally, seat belt monitoring module 70 determines whether the over-the-head threshold, the retraction velocity threshold, and the behind-the-back threshold are all met in a time period that is less than an event threshold. Note that the retraction velocity threshold, over-the-head time threshold and the event threshold comparisons are optional and may or may not be performed. If these comparisons in block 128 are met, an improperly routed indicator is set in block 130. If not, another false reset check is performed in block 132.

After setting the improperly routed indicator in block 130, seat belt monitoring module 70 performs a reset check in block 136. During the reset check, seat belt monitoring module 70 determines whether seat belt 38 is unspooled from retractor mechanism 44 and then re-spooled onto the retractor mechanism 44 so that the reset threshold value is passed (after it has passed the reset threshold as the seat belt was pulled out of the retractor). If so, the improper routing indicator is replaced with a proper routing indicator in block 138 and seat belt monitoring module 70 determines whether the reset was a false reset in block 132. If not, the method returns to block 128.

In block 132, seat belt monitoring module 70 determines whether seat belt 38 is respooled onto retractor mechanism 44 to a magnitude that is less than a false reset threshold. If so, the false reset threshold is updated in block 142 and monitoring returns to block 130. If not, then the second series of determinations is again made in block 128. Monitoring of seat belt 38 continues as long as seat 22 is occupied, vehicle is active, and buckle sensor 76 returns a positive output. In addition, at block 132, the method may optionally determine if the false reset occurred within a false reset time threshold. For this optional additional false reset time threshold check, if the length of time from the reset to properly routed in block 138 to when the false reset threshold is passed is less than the false reset time threshold, then the method proceeds to block 142. Otherwise, the method proceeds to block 128. In this way, the seat belt monitoring system 60 assures that seat belt 38 is not being worn in a lap belt only routing configuration while vehicle 10 is in use. When a determination is made that seat belt 38 is improperly routed, seat belt monitoring system 60 may prohibit activation of vehicle 10.

Figure 8:
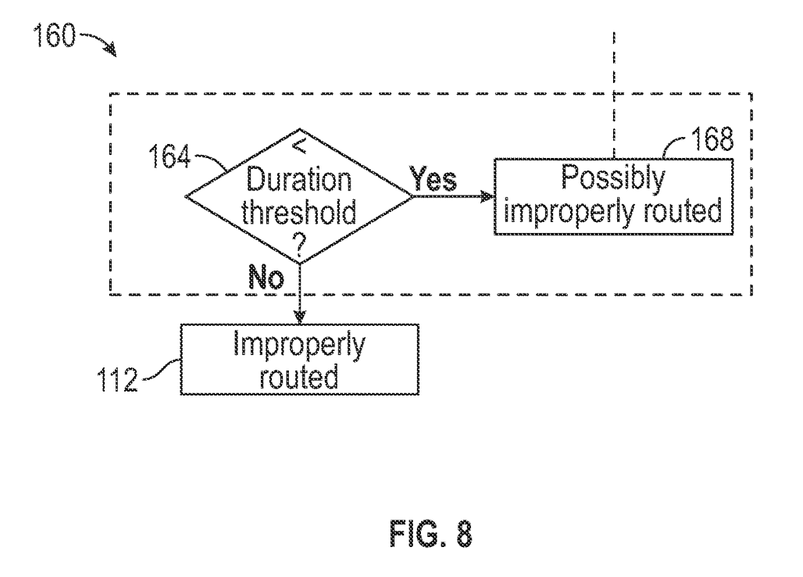
FIG. 8 is a flow chart illustrating an optional short duration check for determining if lap belt routing detection occurred too quickly, in accordance with another aspect of a non-limiting example.

In accordance with a non-limiting example, method 90 may also include a duration check routine 160 as shown in FIG. 8. Duration check routine 160 may be executed in block 164 arranged between block 104 and block 112. In block 164, seat belt monitoring module 70 determines whether the over-the-head threshold, the retraction velocity threshold, and the behind the back threshold are all met in a time period from the time of buckling that is less than a short duration threshold. That is, seat belt monitoring module 70 determines whether routing detection in block 104 occurred too quickly such that reset detection logic would not catch a true reset or a false reset.

If seat belt monitoring module 70 determines that the routing detection duration was less than the short duration threshold, a possibly improper routing designation is set in block 168 and method 90 returns to block 104 to be rechecked. Alternatively, the method could require the seat belt to be unbuckled and then re-buckled to reset the approach from a possibly improper routing designation. If, seat belt monitoring module 70 determines that the routing detection duration was greater than the short duration threshold, method 90 proceeds to block 112 setting an improper routing designation before continuing to check for a reset.

Figure 9:
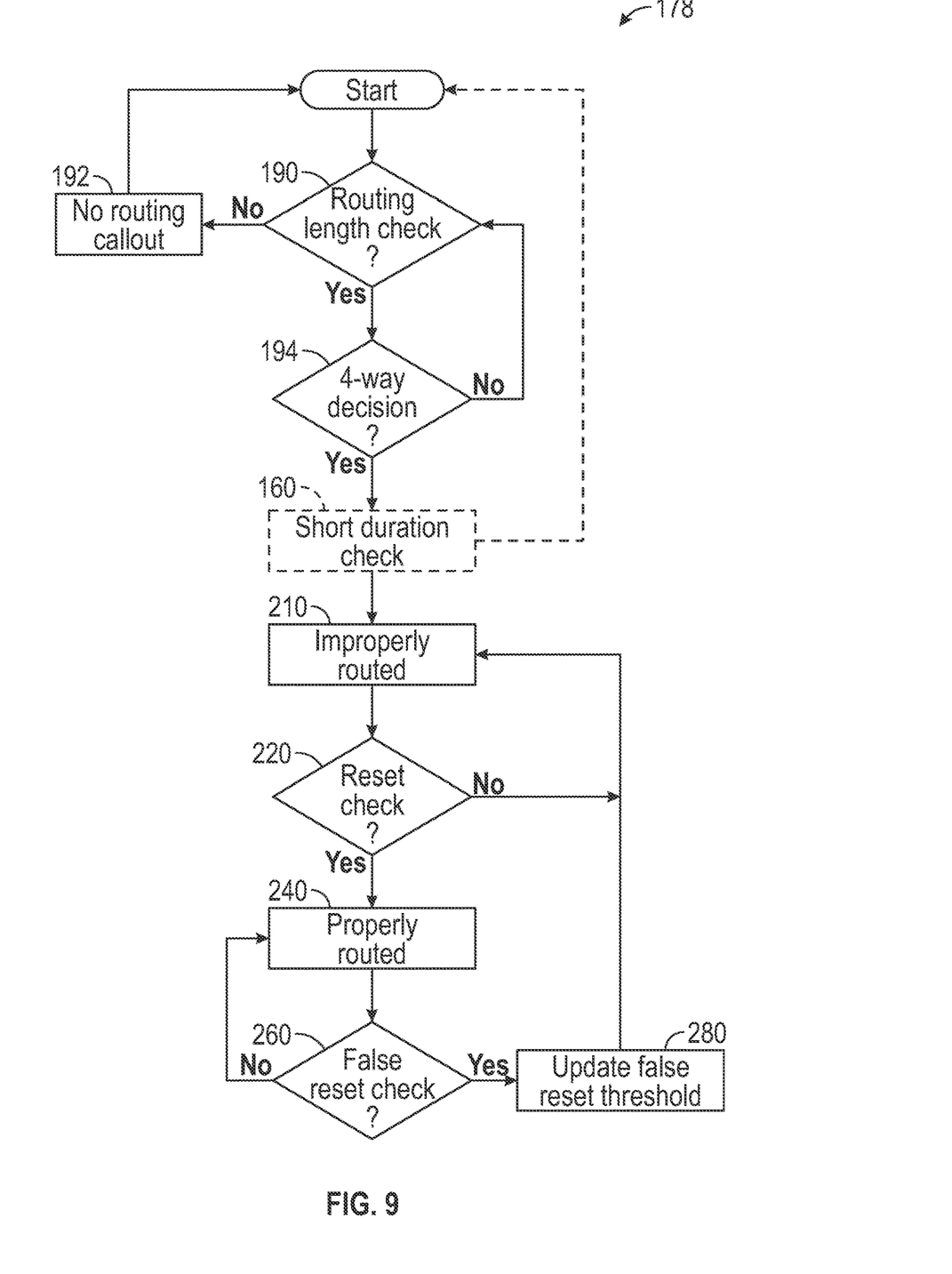
FIG. 9 is a flow chart illustrating a method of detecting lap belt use only, in accordance with another aspect of a non-limiting example.

At this point, it should be understood that method 90 proceeds to monitor seat belt 38 and provides a passenger with unlimited reset checks. That is, the passenger is provided an unlimited number of opportunities to correct improper routing cycles when an additional misrouting action has occurred after each time that seat belt 38 has been reset to proper routing. In a non-limiting example, seat belt monitoring system 60 may alternatively be programmed with a method 178, as shown in FIG. 9, that allows for a single reset by the passenger. In a manner similar to that discussed herein, method 178 is initiated by seat belt monitoring system 60 after signals are received from at least a seat presence sensor 74 and a buckle sensor 76 indicating that, for example, seat 22 is occupied and seat belt 38 is buckled. In block 190, seat belt monitoring module 70 performs a routing length check.

The routing length check determines whether a length of seat belt 38 unspooled from retractor mechanism 44 is greater than or equal to a minimum seat belt length threshold stored in non-volatile memory 68. The minimum seat belt length threshold represents the minimum length required for the passenger to wear the lap and shoulder belt portions of the seat belt in a configuration where they are both routed over the passenger's body. Alternatively, the minimum seat belt length threshold can represent the minimum seat belt length where the method described herein can provide accurate seat belt routing detection for a lap belt only routing. The length of seat belt 38 unspooled from retractor mechanism 44, which is compared to the minimum seat belt length threshold can be referred to as the minimum seat belt routing length which is the minimum seat belt length within a specified time window after the seat belt is buckled or the minimum length within this specified time window prior to the length increasing beyond a specified delta amount. If the length of seat belt 38 unspooled from retractor mechanism 44 is less than the minimum seat belt length threshold no routing warning/callout is issued in block 192 and monitoring continues. If the length of seat belt 38 unspooled from retractor mechanism 44 is greater than or equal to the minimum seat belt length threshold, a series of determinations are made in block 194.

In block 194 seat belt monitoring module 70 makes the same determinations made in block 104. That is, a determination is made whether the length of seat belt 38 unspooled from retractor mechanism 44 exceeds the over-the-head threshold based on data stored in non-volatile memory 68. In accordance with a non-limiting example, seat belt monitoring module 70 may also check to determine whether the length of seat belt 38 unspooled from retractor mechanism 44 exceeds the over-the-head threshold and was unspooled in a time duration that is equal to or exceeds the over-the-head time duration threshold stored in non-volatile memory 68. At this point, a determination is made whether the length of seat belt 38 decreases at a rate having a negative magnitude that exceeds a retraction velocity threshold stored in non-volatile memory 68 when seat belt 38 is re-spooled onto retractor mechanism 44.

Still in block 194, seat belt monitoring module 70 determines whether the length of seat belt 38 unspooled from retractor mechanism 44 is less than a behind-the-back threshold based on data stored in memory 68. Finally, seat belt monitoring module 70 determines whether the over-the-head threshold, the retraction velocity threshold, and the behind-the-back threshold are all met in a time period that is less than an event threshold. Note that the retraction velocity threshold, over-the-head time threshold and the event threshold comparisons are optional and may or may not be performed. If these comparisons in block 194 are met, an improperly routed indicator is set in block 210. If not, the method returns to block 190.

After setting the improperly routed indicator in block 210, seat belt monitoring module 70 performs a reset check in block 220. During the reset check, seat belt monitoring module 70 determines whether seat belt 38 is unspooled from retractor mechanism 44 and then re-spooled into retractor so that reset threshold value is passed as the seat belt spools into the retractor (after it has passed the reset threshold as the seat belt was pulled out of the retractor). If so, the improper routing indicator is replaced with a proper routing indicator in block 240 and seat belt monitoring module 70 determines whether the reset was a false reset in block 260. If not, the method returns to the improper routing indicator in block 210.

In block 260 seat belt monitoring module 70 determines whether seat belt 38 is respooled onto retractor mechanism 44 to a magnitude that is less than a false reset threshold. If so, the false reset threshold is updated in block 280 and the method returns to block 210. If not, then the method returns to block 240 with a properly routed indication. Monitoring of seat belt 38 continues as long as seat 22 is occupied, vehicle is active, and buckle sensor 76 returns a positive output. In addition, at block 260, the method may optionally determine if the false reset occurred within a false reset time threshold. For this optional additional false reset time threshold check, if the length of time from the reset to properly routed in block 240 to when the false reset threshold is passed is less than the false reset time threshold, then the method proceeds to block 280. Otherwise, the method proceeds to block 240.

In a manner similar to that discussed herein, method 178 may also include duration check routine 160 as shown in FIG. 8. Duration check routine 160 may be executed between block 194 and block 210.

At this point, it should be understood that the non-limiting examples discussed herein provide a method and system for monitoring seat belts for improper routing of a shoulder belt. If an improperly routed shoulder belt is detected a passenger is given a warning and an opportunity to correct. If the shoulder belt remains improperly routed, the system may inhibit operation of vehicle 10.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of detecting improper routing of a seat belt having a lap belt portion and a shoulder belt portion by an occupant of a vehicle, the method comprising:
   detecting whether the seat belt has been buckled;
   when the seat belt is detected as being buckled, detecting a first length of the seat belt unspooled from a retractor during a time duration, and determining a minimum seat belt length based on the first length;
   determining an over-the-head length threshold based on the minimum seat belt length and stored data indicating a first predetermined relationship between minimum seat belt length and over-the-head length threshold;
   determining a behind-the-back threshold based on the minimum seat belt length and stored data indicating a second predetermined relationship between minimum seat belt length and behind-the-back threshold;
   detecting a second length of the seat belt unspooled;
   determining whether the seat belt has been placed over the head of the occupant based on the second length and the over-the-head threshold;
   when determined that the seat belt has been placed over the head of the occupant, detecting a movement of the seat belt from the second length to a third length;
   determining whether the shoulder belt portion was placed behind a back of the occupant based on the third length and the behind-the-back threshold; and
   providing a warning indicting improper routing of the shoulder belt portion of the seat belt when determined that the shoulder belt portion was placed behind the back of the occupant.

2. The method of claim 1 wherein the detecting the movement of the seat belt from the second length to the third length comprises determining whether the seat belt has retracted into the retractor at a rate that is greater than a retraction velocity threshold.

3. The method of claim 1, further comprising checking for a length-based reset of the seat belt after detecting the movement of the seat belt indicating that the shoulder belt portion was placed behind the back of the occupant.

4. The method of claim 3, wherein checking for the length-based reset includes determining whether a change in the length of the seat belt is less than a false reset threshold.

5. The method of claim 4, further comprising indicating a false reset if the change in the length of the seat belt is less than the false reset threshold.

6. The method of claim 5, further comprising determining whether the seat belt has been withdrawn from the retractor by a length that exceeds the over-the-head threshold length after indicating the false reset.

7. The method of claim 6, further comprising determining whether the length of the seat belt retracted into the retractor at a selected rate if the seat belt has been withdrawn from the retractor by a length that exceeds the over-the-head threshold length after the false reset is indicated.

8. The method of claim 4, wherein checking for the length-based reset includes identifying that the change in the length of the seat belt occurred within a time duration that is less than a false reset time threshold.

9. The method of claim 4, further comprising indicating a properly routed shoulder belt portion of the seat belt if the length of the seat belt is below the reset threshold and above the false reset threshold.

10. The method of claim 4, further comprising recalculating the false reset threshold based on the over-the-head threshold length, a minimum payout value when the seat belt is improperly routed, and a reset percent value after detecting a false reset.

11. The method of claim 1, further comprising sensing one of a presence of an occupant in a seat in the vehicle associated with the seat belt and sensing that the length of the seat belt withdrawn from a retractor exceeds a minimum seat belt routing length.

12. The method of claim 1, further comprising inhibiting vehicle operation if the warning indicting improper routing of the shoulder belt portion of the seat belt is active.

13. The method of claim 1, wherein detecting the movement of the seat belt includes monitoring a seat belt length played out from the retractor with a first sensor and monitoring that the seat belt is buckled with a second sensor.

14. The method of claim 1, further comprising setting one or more decision flags when detecting movement of the seat belt.

15. A vehicle comprising:
   a body including a passenger compartment; and
   a seat arranged in the passenger compartment, the seat including a seat belt having a lap belt portion and a shoulder belt portion,
   wherein the seat belt is operatively connected to a controller programmed to perform the method of claim 1.

16. The method of claim 1, wherein the over-the-head threshold is calculated from a line equation derived from fitting historical measured data.

17. The method of claim 1, wherein the over-the-head threshold determined from a correspondence table.

18. The method of claim 1, wherein the behind-the-back threshold is calculated from a line equation derived from fitting historical measured data.

19. The method of claim 1, wherein the behind-the-back threshold is calculated from a line equation derived from fitting historical measured data.

20. A vehicle comprising:
   a body including a passenger compartment;
   a seat arranged in the passenger compartment, the seat including a seat belt having a lap belt portion and a shoulder belt portion; and
   a controller operatively connected to the seat belt,
   wherein the controller is programmed to perform the method of claim 1.

* * * * *